(12) United States Patent
Kostka, Jr. et al.

(10) Patent No.: US 11,112,115 B2
(45) Date of Patent: Sep. 7, 2021

(54) CONTOURED DILUTION PASSAGES FOR GAS TURBINE ENGINE COMBUSTOR

(71) Applicant: United Technologies Corporation, Hartford, CT (US)

(72) Inventors: Stanislav Kostka, Jr., Middletown, CT (US); Randal G. McKinney, Ellington, CT (US); James B. Hoke, Tolland, CT (US); Timothy S. Snyder, Glastonbury, CT (US); Frank J. Cunha, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 441 days.

(21) Appl. No.: 14/910,827

(22) PCT Filed: Jun. 30, 2014

(86) PCT No.: PCT/US2014/044896
§ 371 (c)(1),
(2) Date: Feb. 8, 2016

(87) PCT Pub. No.: WO2015/030927
PCT Pub. Date: Mar. 5, 2015

(65) Prior Publication Data
US 2016/0186998 A1    Jun. 30, 2016

Related U.S. Application Data

(60) Provisional application No. 61/872,410, filed on Aug. 30, 2013.

(51) Int. Cl.
*F23R 3/06* (2006.01)
*F23R 3/26* (2006.01)
(Continued)

(52) U.S. Cl.
CPC .............. *F23R 3/06* (2013.01); *F02C 7/18* (2013.01); *F23R 3/002* (2013.01); *F23R 3/04* (2013.01);
(Continued)

(58) Field of Classification Search
CPC .. F23R 3/002; F23R 3/04; F23R 3/045; F23R 3/06; F23R 3/26; F02C 7/18
See application file for complete search history.

(56) References Cited

U.S. PATENT DOCUMENTS

| | | | | |
|---|---|---|---|---|
| 1,095,218 A | * | 5/1914 | Lefever | B24D 15/08 |
| | | | | 451/316 |
| 3,134,229 A | * | 5/1964 | Johnson | F23R 3/04 |
| | | | | 60/748 |

(Continued)

OTHER PUBLICATIONS

EP office actionf or EP14840707.5 dated Mar. 2, 2018.
EP search report for EP14830707.5 dated Jul. 26, 2016.

*Primary Examiner* — Steven M Sutherland
*Assistant Examiner* — Rodolphe Andre Chabreyrie
(74) *Attorney, Agent, or Firm* — Getz Balich LLC

(57) ABSTRACT

A wall assembly for use in a combustor of a gas turbine engine includes a support shell with a first inner periphery along an axis and a liner panel with a second inner periphery along the axis. The second inner periphery is smaller than the first inner periphery. Another wall assembly for use in a combustor of a gas turbine engine includes an annular grommet mounted between the support shell and the liner panel. The annular grommet defines a contoured inner wall.

14 Claims, 6 Drawing Sheets

(51) Int. Cl.
  *F23R 3/04* (2006.01)
  *F02C 7/18* (2006.01)
  *F23R 3/00* (2006.01)

(52) U.S. Cl.
  CPC .............. *F23R 3/045* (2013.01); *F23R 3/26* (2013.01); *F23R 2900/03041* (2013.01); *F23R 2900/03044* (2013.01); *Y02T 50/60* (2013.01)

(56) References Cited

U.S. PATENT DOCUMENTS

| | | | | |
|---|---|---|---|---|
| 3,545,202 | A * | 12/1970 | Batt | F23R 3/08 60/757 |
| 3,593,518 | A * | 7/1971 | Gerrard | F23R 3/04 431/352 |
| 3,594,109 | A * | 7/1971 | Penny | F01D 25/005 60/753 |
| 3,981,142 | A * | 9/1976 | Irwin | F23M 5/00 60/753 |
| 4,132,066 | A * | 1/1979 | Austin, Jr. | F23R 3/06 60/752 |
| 4,302,941 | A | 12/1981 | Dubell | |
| 4,315,405 | A * | 2/1982 | Pidcock | F23R 3/04 60/751 |
| 4,805,397 | A * | 2/1989 | Barbier | F23R 3/002 60/759 |
| 4,875,339 | A * | 10/1989 | Rasmussen | F23R 3/045 60/757 |
| 4,887,432 | A * | 12/1989 | Mumford | F23R 3/045 60/759 |
| 5,138,841 | A * | 8/1992 | Skidmore | F23R 3/04 60/752 |
| 5,187,937 | A * | 2/1993 | Stevens | F23R 3/06 60/752 |
| 5,209,067 | A * | 5/1993 | Barbier | F23R 3/06 60/757 |
| 5,501,071 | A | 3/1996 | Ansart et al. | |
| 5,687,572 | A * | 11/1997 | Schrantz | F23R 3/007 431/352 |
| 6,655,149 | B2 | 12/2003 | Farmer et al. | |
| 6,675,587 | B2 | 1/2004 | Graves et al. | |
| 6,715,292 | B1 | 4/2004 | Hoke | |
| 7,093,439 | B2 | 8/2006 | Pacheco-Tougas et al. | |
| 7,631,502 | B2 | 12/2009 | Burd et al. | |
| 7,669,422 | B2 | 3/2010 | Suleiman et al. | |
| 7,726,131 | B2 | 6/2010 | Sze et al. | |
| 7,984,615 | B2 | 7/2011 | Woodcock et al. | |
| 8,028,529 | B2 | 10/2011 | Venkataraman et al. | |
| 8,047,008 | B2 | 11/2011 | Lebegue et al. | |
| 8,091,367 | B2 | 1/2012 | Alkabie | |
| 8,161,752 | B2 * | 4/2012 | Yankowich | F23R 3/045 60/752 |
| 8,176,739 | B2 | 5/2012 | Evulet et al. | |
| 8,333,077 | B2 | 12/2012 | Lebegue et al. | |
| 8,397,510 | B2 | 3/2013 | Dodo et al. | |
| 8,397,511 | B2 * | 3/2013 | Chen | F01D 9/023 60/752 |
| 8,448,443 | B2 | 5/2013 | Berry et al. | |
| 9,052,111 | B2 * | 6/2015 | Erbas-Sen | F23R 3/06 |
| 9,360,215 | B2 * | 6/2016 | McKenzie | F23R 3/007 |
| 9,851,105 | B2 * | 12/2017 | Propheter-Hinckley | F23R 3/06 |
| 10,816,203 | B2 * | 10/2020 | Jones | F23R 3/045 |
| 2002/0116929 | A1 * | 8/2002 | Snyder | F23R 3/002 60/740 |
| 2002/0184889 | A1 * | 12/2002 | Calvez | F23R 3/007 60/796 |
| 2003/0046934 | A1 * | 3/2003 | Sherwood | F23R 3/04 60/722 |
| 2003/0182942 | A1 * | 10/2003 | Gerendas | F23R 3/002 60/752 |
| 2004/0006995 | A1 | 1/2004 | Snyder | |
| 2007/0125093 | A1 * | 6/2007 | Burd | F23R 3/04 60/804 |
| 2008/0271457 | A1 * | 11/2008 | McMasters | F23R 3/002 60/754 |
| 2009/0241553 | A1 * | 10/2009 | Lebegue | F01D 9/023 60/800 |
| 2010/0024427 | A1 * | 2/2010 | Graves | F23R 3/06 60/748 |
| 2010/0122537 | A1 * | 5/2010 | Yankowich | F23R 3/005 60/754 |
| 2010/0170256 | A1 * | 7/2010 | Kaleeswaran | F23R 3/005 60/754 |
| 2010/0181889 | A1 * | 7/2010 | Falicoff | F21K 9/00 313/46 |
| 2010/0186416 | A1 * | 7/2010 | Chen | F23R 3/06 60/755 |
| 2010/0218504 | A1 * | 9/2010 | Bronson | F23R 3/045 60/754 |
| 2010/0223930 | A1 * | 9/2010 | Chila | F23R 3/04 60/752 |
| 2010/0242483 | A1 * | 9/2010 | Snyder | F23R 3/06 60/748 |
| 2010/0242488 | A1 * | 9/2010 | Veninger | F23R 3/28 60/772 |
| 2010/0251723 | A1 * | 10/2010 | Chen | F02C 7/18 60/760 |
| 2010/0293957 | A1 * | 11/2010 | Chen | F01D 9/023 60/752 |
| 2011/0126543 | A1 * | 6/2011 | Kirsopp | F23R 3/002 60/742 |
| 2011/0209482 | A1 * | 9/2011 | Toqan | F01D 9/023 60/804 |
| 2012/0060504 | A1 * | 3/2012 | Dugar | F23R 3/002 60/772 |
| 2012/0297778 | A1 * | 11/2012 | Rudrapatna | F23R 3/045 60/755 |
| 2013/0025288 | A1 * | 1/2013 | Cunha | F23R 3/002 60/772 |
| 2013/0025293 | A1 | 1/2013 | Kim et al. | |
| 2013/0031906 | A1 * | 2/2013 | DiCintio | F23R 3/045 60/737 |
| 2013/0078582 | A1 * | 3/2013 | Pidcock | F23R 3/04 431/12 |
| 2013/0104553 | A1 | 5/2013 | Stoia et al. | |
| 2013/0232980 | A1 * | 9/2013 | Chen | F23R 3/045 60/754 |
| 2013/0255265 | A1 * | 10/2013 | Rudrapatna | F23R 3/06 60/754 |
| 2014/0102106 | A1 * | 4/2014 | Snyder | F23R 3/04 60/752 |
| 2014/0144148 | A1 * | 5/2014 | Jause | F02C 7/20 60/772 |
| 2015/0027127 | A1 * | 1/2015 | Clemen | F23R 3/002 60/752 |
| 2015/0362190 | A1 * | 12/2015 | Taylor | F23R 3/002 60/752 |
| 2016/0003477 | A1 * | 1/2016 | Propheter-Hinckley | F23R 3/005 60/752 |
| 2016/0010863 | A1 * | 1/2016 | Ott | F23R 3/04 428/141 |
| 2016/0131363 | A1 * | 5/2016 | Cunha | F16C 29/02 60/755 |
| 2016/0201908 | A1 * | 7/2016 | Drake | F23R 3/002 60/782 |
| 2016/0209035 | A1 * | 7/2016 | Cramer | F23R 3/06 |
| 2017/0058775 | A1 * | 3/2017 | Patel | F02C 7/18 |
| 2017/0307217 | A1 * | 10/2017 | Clemen | F02C 7/18 |
| 2018/0231252 | A1 * | 8/2018 | Clemen | F02K 3/06 |

\* cited by examiner

CONTOURED DILUTION PASSAGES FOR GAS TURBINE ENGINE COMBUSTOR

CROSS-REFERENCE TO RELATED APPLICATION

This application claims priority to PCT Patent Application No. PCT/US2014/044896 filed Jun. 30, 2014, which claims priority to U.S. Patent Appln. Ser. No. 61/872,410 filed Aug. 30, 2013, which are is hereby incorporated herein by reference in their its entireties.

STATEMENT REGARDING FEDERALLY SPONSORED RESEARCH OR DEVELOPMENT

This disclosure was made with Government support under FA8650-09-D-2923 0021 awarded by the United States Air Force. The Government may have certain rights in this disclosure.

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section typically includes an outer shell lined with heat shields often referred to as floatwall panels which are attached to the outer shell with studs and nuts. In certain arrangements, dilution holes in the floatwall panel communicate with respective dilution holes in the outer shell to direct cooling air for dilution of the combustion gases. In addition to the dilution holes, the outer shell may also have relatively smaller air impingement holes to direct cooling air between the floatwall panels and the outer shell to cool the cold side of the floatwall panels. This cooling air exits effusion holes on the surface of the floatwall panels to form a film on a hot side of the floatwall panels which serves as a barrier against thermal damage.

One particular region where localized hot spots may arise is around the combustor dilution holes. The dilution holes inject relative lower temperature air into the swirling fuel-rich cross flow for combustion. As the air penetrates into the fuel-rich cross-stream, heat release takes place along the reaction front creating high temperature regions around the dilution holes. A stagnation region along the upstream side of the dilution jets also forms a higher pressure environment such that cross flow momentum deflects the incoming dilution jet. It is the combination of high pressure and the deflection of the incoming jet which is believed to create a high temperature recirculation region along the inner surface of the dilution hole.

A lower velocity region of flow along the perimeter of the dilution hole may be highly susceptible to inflow of hot combustion gas products. The inflow of these products can occur within a localized ingestion region and may result in a durability concern because a low temperature boundary condition is replaced by high temperature gases.

SUMMARY

A wall assembly is provided for use in a combustor of a gas turbine engine according to one disclosed non-limiting embodiment of the present disclosure. This wall assembly includes a support shell with a first inner periphery along an axis and a liner panel with a second inner periphery along the axis. The second inner periphery is smaller than the first inner periphery.

In a further embodiment of the present disclosure, the first inner periphery and/or the second inner periphery may be circular.

In a further embodiment of any of the foregoing embodiments of the present disclosure, the first inner periphery and/or the second inner periphery may be oval.

In a further embodiment of any of the foregoing embodiments of the present disclosure, the first inner periphery and the second inner periphery may define a dilution passage.

In a further embodiment of any of the foregoing embodiments of the present disclosure, a contoured inner wall may be included around the axis axially between the first inner periphery and the second inner periphery.

In a further embodiment of any of the foregoing embodiments of the present disclosure, the contoured inner wall may define a convex toward the axis.

In a further embodiment of any of the foregoing embodiments of the present disclosure, the contoured inner wall may converge toward the axis from the first inner periphery toward the second inner periphery.

In a further embodiment of any of the foregoing embodiments of the present disclosure, a flow guide may be included along the inner wall.

A wall assembly is provided for use in a combustor of a gas turbine engine according to another disclosed non-limiting embodiment of the present disclosure. This wall assembly includes an annular grommet mounted between a support shell and a liner panel, where the annular grommet defines a contoured inner wall.

In a further embodiment of any of the foregoing embodiments of the present disclosure, the contoured inner wall may form a convergent nozzle.

In a further embodiment of any of the foregoing embodiments of the present disclosure, the contoured inner wall may be non-linear In a further embodiment of any of the foregoing embodiments of the present disclosure, the contoured inner wall may converge toward the axis from the first inner periphery toward the second inner periphery.

In a further embodiment of any of the foregoing embodiments of the present disclosure, a flow guide may be included along the contoured inner wall.

In a further embodiment of any of the foregoing embodiments of the present disclosure, the contoured inner wall may be defined between a first inner periphery and a second inner periphery. The first inner periphery and/or the second inner periphery may be circular.

In a further embodiment of any of the foregoing embodiments of the present disclosure, the contoured inner wall may be defined between a first inner periphery and a second inner periphery. The first inner periphery and/or the second inner periphery may be oval.

In a further embodiment of any of the foregoing embodiments of the present disclosure, the contoured inner wall may be defined between a first inner periphery and a second inner periphery. A first point on the first inner periphery and a second point on the second inner periphery may define a triangle with respect to a third point parallel the axis and the first point, where the triangle defines an acute angle of about twenty-five (25) degrees.

A method of reducing localized hot spots in a combustor of a gas turbine engine is provided according to another disclosed non-limiting embodiment of the present disclosure. This method includes altering an incoming velocity profile of a dilution air jet to minimize hot gas ingestion.

In a further embodiment of any of the foregoing embodiments of the present disclosure, the method may include converging the dilution air jet via a converging convex contoured inner wall of a dilution passage.

In a further embodiment of any of the foregoing embodiments of the present disclosure, the method may include straightening the dilution jet.

In a further embodiment of any of the foregoing embodiments of the present disclosure, the method may include generating a local acceleration of the dilution air jet.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
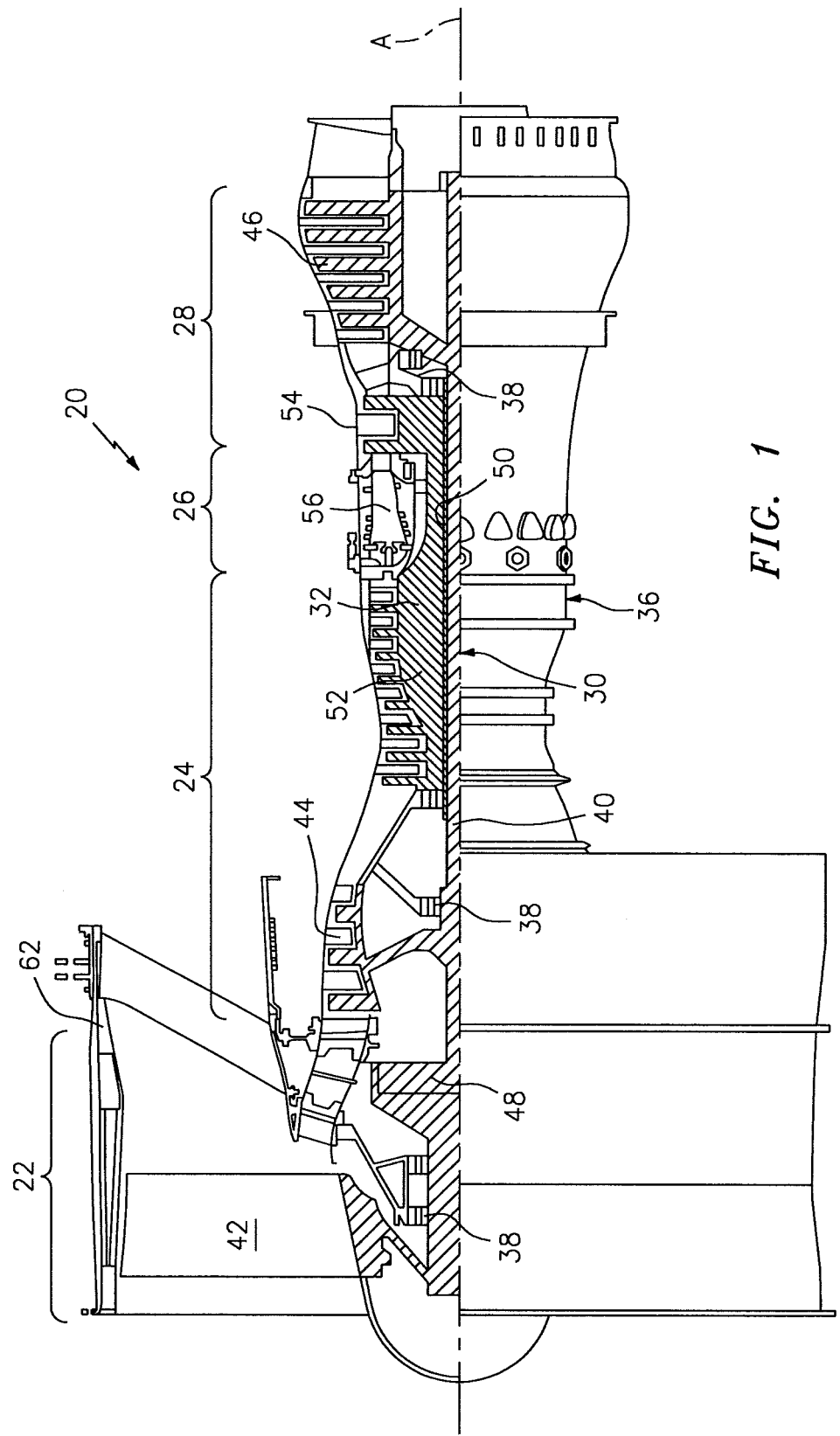
FIG. 1 is a schematic cross-section of an example gas turbine engine architecture.
Figure 2:
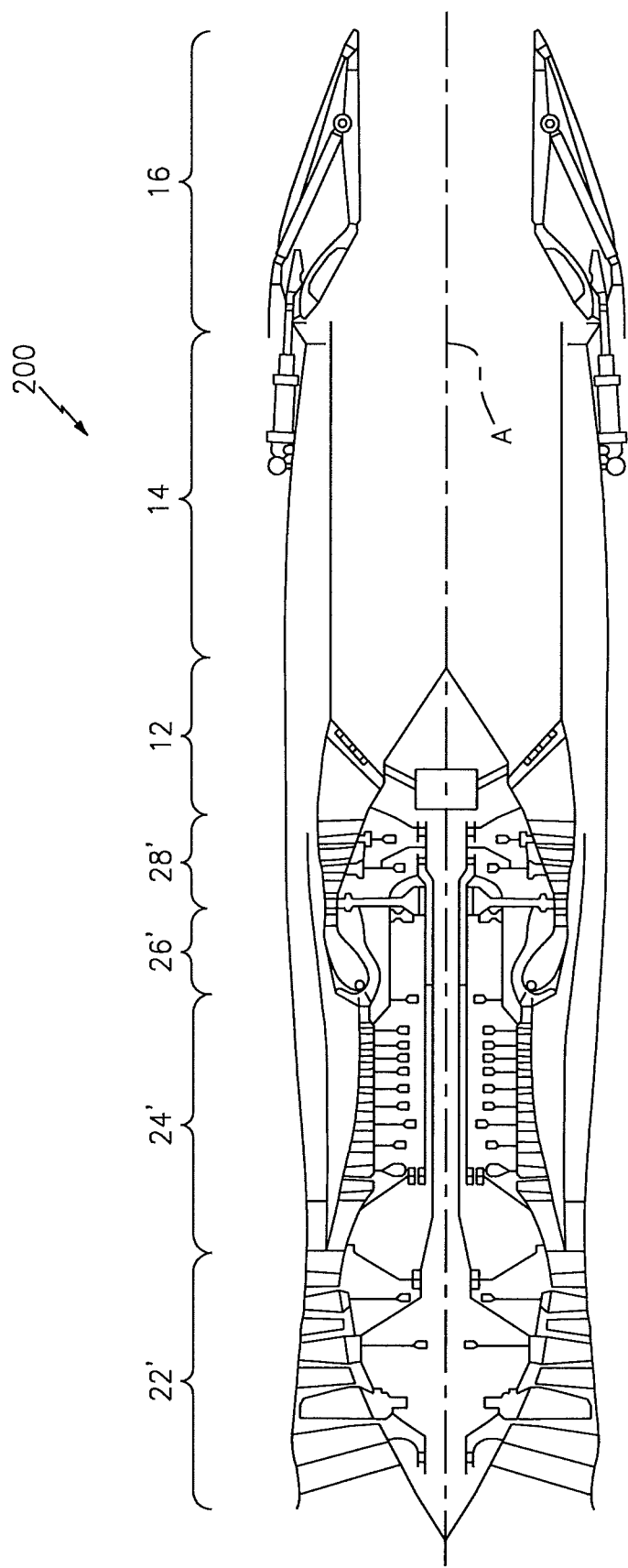
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 200 might include an augmentor section 12, an exhaust duct section 14 and a nozzle section 16 in addition to the fan section 22', compressor section 24', combustor section 26' and turbine section 28' among other systems or features. Referring again to FIG. 1, the fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between a high pressure turbine ("HPT") and a low pressure turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly, or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and the HPT 54 rotationally drive the respective low spool 30 and the high spool 32 in response to the expansion. The main engine shafts 40, 50 are supported at a plurality of points by the bearing structures 38 within the static structure 36. It should be understood that various bearing structures 38 at various locations may alternatively or additionally be provided.

Figure 3:
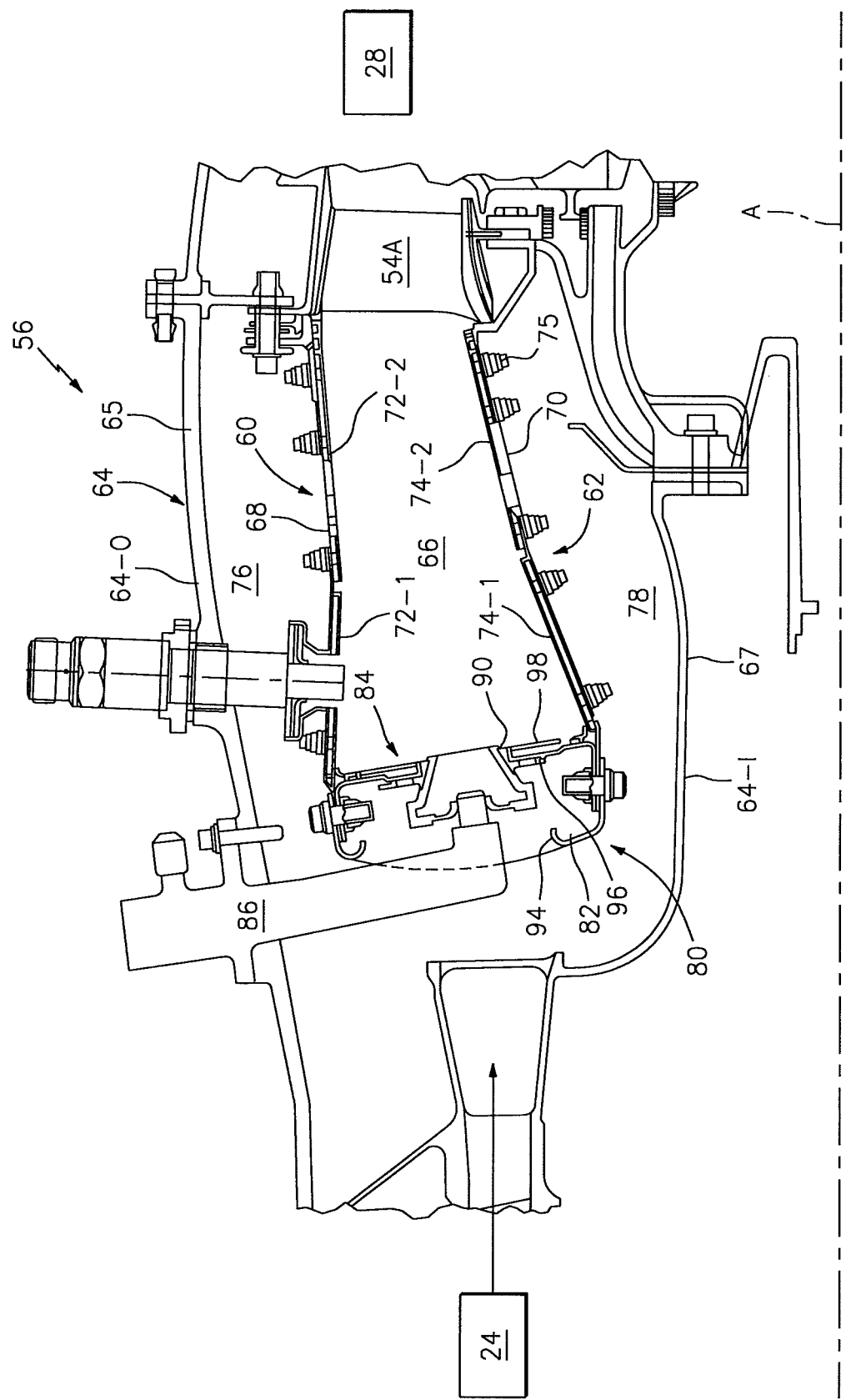
FIG. 3 is an expanded longitudinal schematic sectional view of a combustor section that may be used with the example gas turbine engine architectures shown in FIGS. 1 and 2.

With reference to FIG. 3, the combustor section 26 generally includes the combustor 56 with an outer combustor wall assembly 60, an inner combustor wall assembly 62 and a diffuser case module 64 therearound. The outer combustor wall assembly 60 and the inner combustor wall assembly 62 are spaced apart such that an annular combustion chamber 66 is defined therebetween.

The outer combustor wall assembly 60 is spaced radially inward from an outer diffuser case 64-O of the diffuser case module 64 to define an outer annular plenum 76. The inner combustor wall assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto. Each of the liner panels 72, 74 may be generally rectilinear and manufactured of, for example, a nickel based super alloy, ceramic or other temperature resistant material and are arranged to form a liner array. In the liner array, a multiple of forward liner panels 72A and a multiple of aft liner panels 72B are circumferentially staggered to line the outer shell 68. A multiple of forward liner panels 74A and a multiple of aft liner panels 74B are circumferentially staggered to also line the inner shell 70.

The combustor 56 further includes a forward assembly 80 immediately downstream of the compressor section 24 to receive compressed airflow therefrom. The forward assembly 80 generally includes an annular hood 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84. The bulkhead assembly 84 includes a bulkhead support shell 96 secured to the combustor walls 60, 62, and a multiple of circumferentially distributed bulkhead liner panels 98 secured to the bulkhead support shell 96 around each respective swirler opening 92. The bulkhead support shell 96 is generally annular and the multiple of circumferentially distributed bulkhead liner panels 98 are segmented, typically one to each fuel nozzle 86 and swirler 90.

The annular hood 82 extends radially between, and is secured to, the forwardmost ends of the combustor wall assemblies 60, 62. The annular hood 82 includes the multiple of circumferentially distributed hood ports 94 that receive one of the respective multiple of fuel nozzles 86 and facilitates the direction of compressed air into the forward end of the combustion chamber 66 through a respective one of the swirler openings 92. Each fuel nozzle 86 may be secured to the diffuser case module 64 and project through one of the hood ports 94 into the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and the inner support shells 68, 70 are mounted adjacent to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and the gases are typically given a "spin" or a "swirl" in the direction of turbine rotor rotation. The turbine rotor blades absorb this energy to drive the turbine rotor at high speed.

Figure 4:
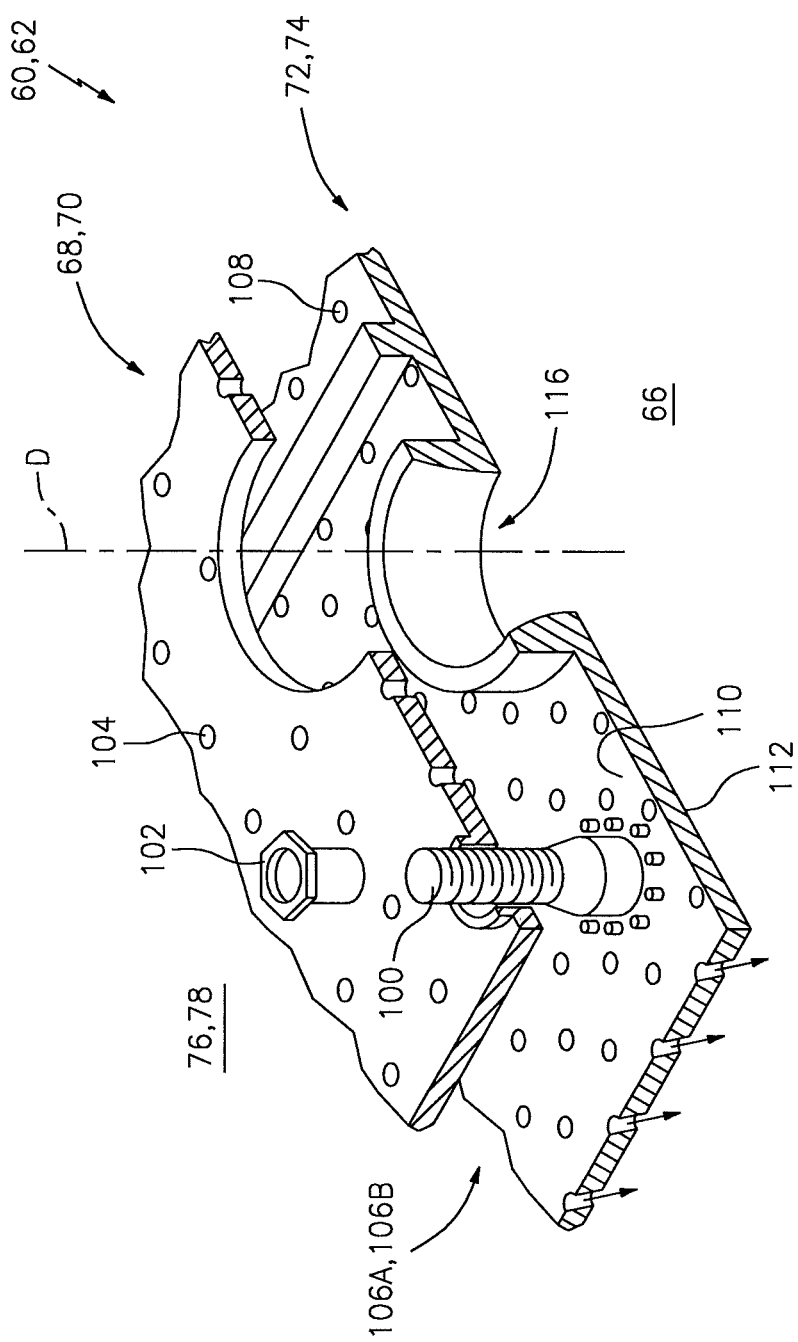
FIG. 4 is an exploded view of a wall assembly with a dilution passage.

With reference to FIG. 4, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 and through the respective support shells 68, 70 to receive the fasteners 102 at a threaded distal end section thereof.

A multiple of cooling impingement passages 104 penetrate through the support shells 68, 70 to allow air from the respective annular plenums 76, 78 to enter cavities 106A, 106B formed in the combustor wall assemblies 60, 62 between the respective support shells 68, 70 and liner panels 72, 74. The cooling impingement passages 104 are generally normal to the surface of the liner panels 72, 74. The air in the cavities 106A, 106B provides cold side impingement cooling of the liner panels 72, 74. As used herein, the term impingement cooling generally implies heat removal from a part via an impinging gas jet directed at a part.

A multiple of effusion passages 108 penetrate through each of the liner panels 72, 74. The geometry of the passages (e.g., diameter, shape, density, surface angle, incidence angle, etc.) as well as the location of the passages with respect to the high temperature main flow also contributes to effusion film cooling. The combination of impingement passages 104 and effusion passages 108 may be referred to as an Impingement Film Floatwall (IFF) assembly.

The effusion passages 108 allow the air to pass from the cavities 106A, 106B defined in part by a cold side 110 of the liner panels 72, 74 to a hot side 112 of the liner panels 72, 74 and thereby facilitate the formation of thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through both the respective support shells 68, 70 and liner panels 72, 74 along a common axis D. For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

Figure 5:
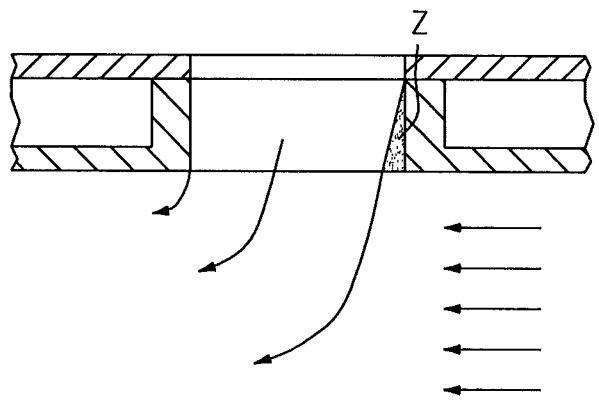
FIG. 5 is a related art sectional view of a dilution passage.

With reference to FIG. 5 (RELATED ART), conventional combustor design utilizes straight-walled dilution passages. The straight walled dilution holes may result in a lower velocity region of flow along the perimeter of the dilution hole which can be highly susceptible to inflow when the dilution air jet is deflected in a cross flow and a higher pressure region is created upstream of the dilution hole. The inflow of combustion products may thereby occur within the region of area Z. This localized ingestion of high temperature gases may provide a durability concern because a low temperature boundary condition possible through contact of the wall with the incoming jet flow is replaced by high temperature gases.

Figure 6:
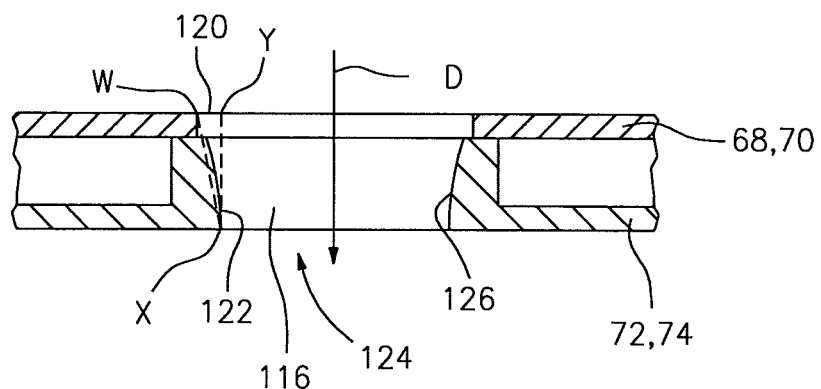
FIG. 6 is a sectional view of a dilution passage.

With reference to FIG. 6, at least one of the multiple of dilution passages 116 includes a first internal periphery 120 defined by the support shells 68, 70 and a second internal periphery 122 defined by the associated liner panels 72, 74 along axis D. The inner peripheries 120, 122 form a contoured nozzle 124 that forms a local acceleration of the flow along the perimeter of the dilution passages 116 to minimize the likelihood of hot gas ingestion. That is, a contoured, converging wall surface of an inner wall 126 of the dilution passage 116 alters the incoming velocity profile of the dilution air jet to minimize hot gas ingestion and therefore improve the global durability of the combustor 56. The first internal periphery 120 and the second internal periphery 122 may be of various radial configurations such as circular or oval.

The second internal periphery 122 is smaller than that of the first internal periphery 120 such that the inner wall 126 defines a convex around axis D or funnel type shape. In one disclosed non-limiting embodiment, first internal periphery 120 defines a point W and the second internal periphery 122 defines a point X. A third point Y is defined with respect to point X axially parallel to axis D to form a triangle between points W, X, Y. Line XW and XY are perpendicular such that the contoured nozzle 124 may be generally defined by an angle α between line WY and WX of about twenty-five (25) degrees. It should be appreciated that this is but one example geometry for a contoured converging dilution passages 116 and that other geometries will also benefit herefrom.

By contouring the inner wall 126 of the dilution passage 116, the discharge coefficient is increased to facilitate a passage that generates similar flow to that of a relatively larger conventional straight wall passage (see FIG. 5). The resultant reduced area of the incoming dilution air jet forms a smaller stagnation area upstream of the dilution passages 116 to further improve durability. By contouring the inner periphery 120, 122 of the dilution passages 116, the discharge coefficient is also increased which allows for the use of a smaller diameter hole to generate identical flows. The resultant reduced area of the incoming dilution air jet may form a relatively smaller stagnation area upstream of the dilution passages 116.

As the dilution air jet directed through the contoured nozzle 124 does not deflect away from the inner surface when subjected to a cross or swirling flow, the hot recirculation zone is minimized if not eliminated. The reduction of hot spots adjacent to dilution passages 116 thereby permits utilization of the relatively limited cooling air elsewhere in the combustor allowing for the more efficient engine operation.

Figure 7:
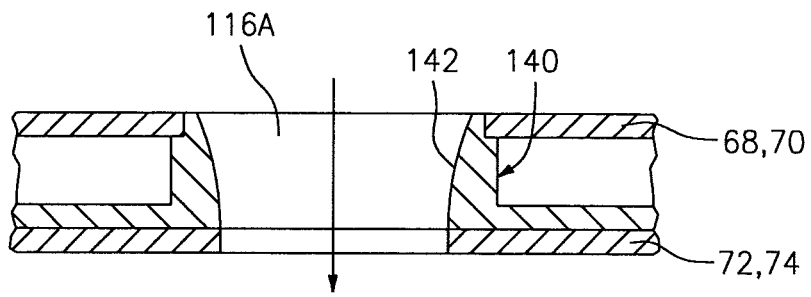
FIG. 7 is a sectional view of a dilution passage.

With reference to FIG. 7, in another disclosed non-limiting embodiment, the dilution passages 116A is defined by an annular grommet 140 mounted between the respective support shell 68, 70 and associated liner panels 72, 74 along axis D. The annular grommet 140 includes an internal periphery 142 that forms a contoured nozzle 124 as above described. The annular grommet 140 permits the respective support shell 68, 70 and associated liner panels 72, 74 to be manufactured as generally consistent flat panels as the annular grommet 140 separately defines the contoured nozzle 124.

Figure 8:
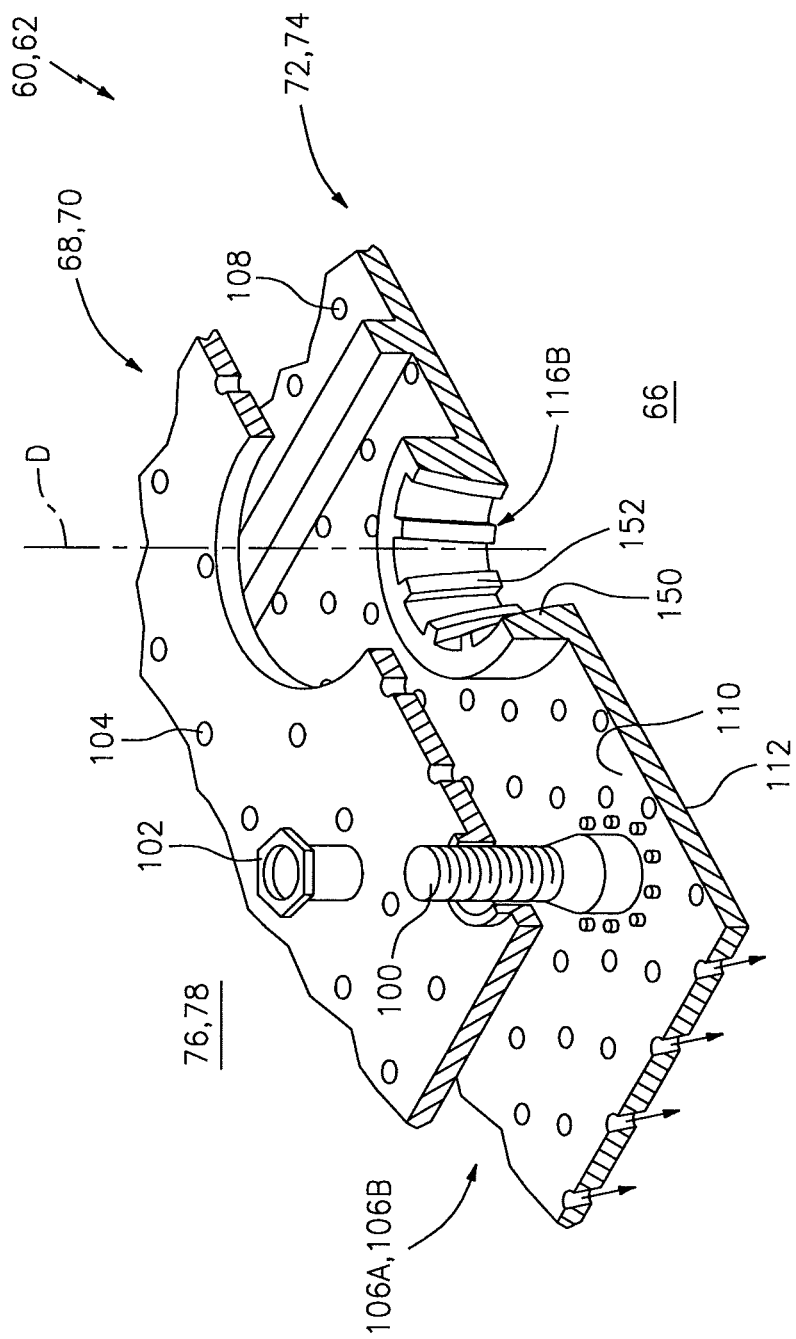
FIG. 8 is an exploded view of a wall assembly with a dilution passage.

With reference to FIG. 8, in another disclosed non-limiting embodiment, the dilution passages 116B defines a convergent nozzle with flow guides 152. The flow guides 152 in one disclosed non-limiting embodiment are raised ridges that extend toward and are generally parallel to the axis D. It should be appreciated that the flow guides 152 need not be parallel to the axis D and may alternatively provide a swirl or counter-swirl as desired. Furthermore, the flow guides 152 may be of various non-rectilinear configurations such as triangular or other shapes.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A wall assembly for use in a combustor of a gas turbine engine, the wall assembly comprising:
    a support shell;
    a liner panel; and
    a converging annular grommet mounted between and connecting the support shell and the liner panel, wherein the converging annular grommet defines a converging contoured inner wall that is at least one of convex or funnel shaped, the converging contoured inner wall extending from a first grommet end of the converging annular grommet to a second grommet end of the converging annular grommet opposite the first grommet end, the second grommet end mounted against a cold side of the liner panel opposite a hot side of the liner panel;
    wherein the converging contoured inner wall continuously converges from the first grommet end to the second grommet end, where the first grommet end has a first inner periphery and the second grommet end has a second inner periphery, the second inner periphery defining a second cross-sectional area which is smaller than that of a first cross-sectional area defined by the first inner periphery;
    wherein the converging contoured inner wall defines a contoured converging dilution passage extending through the liner panel and the support shell about an axis (D);
    wherein a first point (W) on the first inner periphery, a second point (X) on the second inner periphery and a third point (Y) define a triangle;
    wherein a first line defined between the second point (X) and the third point (Y) is parallel to the axis (D) of the contoured converging dilution passage;
    wherein the triangle is defined by the first line, a second line and third line, wherein the second line is defined between the first point and the third point, and the third line is defined between the first point and the second point; and
    wherein the converging contoured inner wall forms a convergent nozzle.

2. The wall assembly of claim 1, wherein the converging contoured inner wall is non-linear.

3. The wall assembly of claim 1, wherein the converging contoured inner wall converges toward the axis (D) from the first inner periphery toward the second inner periphery.

4. The wall assembly of claim 3, further comprising a flow guide along the converging contoured inner wall.

5. The wall assembly of claim 4, wherein the converging contoured inner wall is defined between the first inner periphery and the second inner periphery.

6. The wall assembly of claim 1, wherein the support shell comprises a first hole and the liner panel comprises a second hole, the first hole and the second hole being coaxial with the contoured converging dilution passage extending through the liner panel and the support shell about the axis (D).

7. The wall assembly of claim 6, wherein the second hole comprises a second hole cross-sectional area that is the same as the second cross-sectional area defined by the second inner periphery.

8. The wall assembly of claim 6, wherein the converging annular grommet is disposed, in part, within the first hole of the support shell.

9. A wall assembly for use in a combustor of a gas turbine engine, the wall assembly comprising:
- a support shell;
- a liner panel; and
- a converging annular grommet mounted between and connecting the support shell and the liner panel, wherein the converging annular grommet defines a converging contoured inner wall that is at least one of convex or funnel shaped, the converging contoured inner wall extending from a first grommet end of the converging annular grommet to a second grommet end of the converging annular grommet opposite the first grommet end, the second grommet end mounted against a cold side of the liner panel opposite a hot side of the liner panel;
- wherein the converging contoured inner wall continuously converges from the first grommet end to the second grommet end, where the first grommet end has a first inner periphery and the second grommet end has a second inner periphery, the second inner periphery defining a second cross-sectional area which is smaller than that of a first cross-sectional area defined by the first inner periphery;
- wherein the converging contoured inner wall defines a contoured converging dilution passage extending through the liner panel and the support shell about an axis (D);
- wherein a first point (W) on the first inner periphery, a second point (X) on the second inner periphery and a third point (Y) define a triangle;
- wherein a first line defined between the second point (X) and the third point (Y) is parallel to the axis (D) of the contoured converging dilution passage;
- wherein the triangle defines an angle of twenty five (25) degrees between a second line and a third line, wherein the second line is defined between the first point and the third point, and the third line is defined between the first point and the second point; and
- wherein the converging contoured inner wall forms a convergent nozzle.

10. The wall assembly of claim 9, wherein the converging contoured inner wall is non-linear.

11. The wall assembly of claim 9, wherein the converging contoured inner wall converges toward the axis (D) from the first inner periphery toward the second inner periphery.

12. The wall assembly of claim 11, further comprising a flow guide along the converging contoured inner wall.

13. The wall assembly of claim 12, wherein the converging contoured inner wall is defined between the first inner periphery and the second inner periphery.

14. A wall assembly for use in a combustor of a gas turbine engine, the wall assembly comprising:
- a support shell;
- a liner panel;
- a converging annular grommet mounted between the support shell and the liner panel, wherein the converging annular grommet defines a converging contoured inner wall that is at least one of convex or funnel shaped, the converging contoured inner wall extending from a first grommet end of the converging annular grommet to a second grommet end of the converging annular grommet opposite the first grommet end, the second grommet end in contact with the liner panel;
- wherein the converging contoured inner wall converges from a first inner periphery at the first grommet end and to second inner periphery at the second grommet end where the second inner periphery defines a second cross-sectional area which is smaller than that of a first cross-sectional area defined by the first inner periphery, wherein
  - the first inner periphery and the second inner periphery define a contoured converging dilution passage extending through the liner panel and the support shell about an axis (D);
  - a first point (W) on the first inner periphery, a second point (X) on the second inner periphery and a third point (Y) define a triangle;
  - a first line defined between the second point (X) and the third point (Y) is parallel to the axis (D) of the contoured converging dilution passage;
  - the triangle is defined by the first line, a second line and third line, wherein the second line is defined between the first point and the third point, and the third line is defined between the first point and the second point; and
  - the converging contoured inner wall forms a convergent nozzle; and
- a flow guide extending along the converging contoured inner wall and protruding towards the axis (D) and having a triangular shape.

* * * * *